(12) United States Patent
Allegue Martinez et al.

(10) Patent No.: US 10,447,415 B2
(45) Date of Patent: Oct. 15, 2019

(54) SYSTEMS AND METHODS FOR SENSING AN ENVIRONMENT WITH WIRELESS COMMUNICATION SIGNALS

(71) Applicant: Aerial Technologies Inc., Montreal (CA)

(72) Inventors: Michel Allegue Martinez, Montreal (CA); Xi Chen, Montreal (CA)

(73) Assignee: Aerial Technologies Inc., Montreal (CA)

(*) Notice: Subject to any disclaimer, the term of this patent is extended or adjusted under 35 U.S.C. 154(b) by 0 days.

(21) Appl. No.: 16/003,044

(22) Filed: Jun. 7, 2018

(65) Prior Publication Data

US 2018/0294904 A1  Oct. 11, 2018

Related U.S. Application Data

(63) Continuation of application No. PCT/CA2017/050116, filed on Feb. 1, 2017.

(60) Provisional application No. 62/291,238, filed on Feb. 4, 2016.

(51) Int. Cl.
| | |
|---|---|
| *G01D 5/48* | (2006.01) |
| *G01D 21/00* | (2006.01) |
| *H04W 84/00* | (2009.01) |
| *H04B 17/00* | (2015.01) |
| *H04W 24/08* | (2009.01) |
| *H04B 17/391* | (2015.01) |
| *H04L 12/26* | (2006.01) |

(52) U.S. Cl.
CPC ........... *H04B 17/391* (2015.01); *G01D 5/48* (2013.01); *G01D 21/00* (2013.01); *H04B 17/0085* (2013.01); *H04W 24/08* (2013.01); *H04W 84/00* (2013.01); *H04L 43/50* (2013.01); *Y04S 20/48* (2013.01)

(58) Field of Classification Search
CPC combination set(s) only.
See application file for complete search history.

(56) References Cited

U.S. PATENT DOCUMENTS

| | | | |
|---|---|---|---|
| 7,042,391 B2 | 5/2006 | Meunier et al. | |
| 7,577,238 B2 | 8/2009 | Small et al. | |
| 7,729,442 B2 | 6/2010 | Kim et al. | |
| 10,122,479 B2* | 11/2018 | Dzierwa | H04B 17/30 |
| 2002/0129368 A1* | 9/2002 | Schlack | G06Q 30/02 |
| | | | 725/46 |
| 2008/0007404 A1 | 1/2008 | Albert et al. | |
| 2008/0133699 A1* | 6/2008 | Craw | G16H 40/20 |
| | | | 709/217 |

(Continued)

OTHER PUBLICATIONS

Kotylak, T.; International Search Report from corresponding PCT Application No. PCT/CA2017/050116; search completed May 16, 2017.

(Continued)

*Primary Examiner* — Ganiyu A Hanidu
(74) *Attorney, Agent, or Firm* — Brett J. Slaney; Blake, Cassels & Graydon LLP

(57) ABSTRACT

A system and method are provided, for sensing an environment. The system and method analyze wireless signals in the environment to determine effects on the wireless signal by the environment during propagation thereof, the effects being indicative of at least one characteristic of the environment.

20 Claims, 12 Drawing Sheets

(56) References Cited

U.S. PATENT DOCUMENTS

| | | | |
|---|---|---|---|
| 2008/0150528 A1* | 6/2008 | Cunningham | G01R 33/246 324/309 |
| 2010/0034092 A1 | 2/2010 | Krishnamurthy et al. | |
| 2010/0099393 A1* | 4/2010 | Brisebois | H04M 15/00 455/418 |
| 2011/0242982 A1 | 10/2011 | Lunttila et al. | |
| 2015/0326273 A1* | 11/2015 | Rakib | H04L 5/0048 375/131 |
| 2016/0072597 A1* | 3/2016 | Carbajal | H04L 27/0006 375/340 |

OTHER PUBLICATIONS

Wilson, J. et al.; "See Through Walls: Motion Tracking Using Variance-Based Radio Tomography Networks"; IEEE Transactions on Mobile Computing; vol. 10, No. 5; May 2011.

* cited by examiner

SYSTEMS AND METHODS FOR SENSING AN ENVIRONMENT WITH WIRELESS COMMUNICATION SIGNALS

CROSS-REFERENCE TO RELATED APPLICATION

This application is a continuation of PCT Application No. PCT.CA2017/050116 filed on Feb. 1, 2017, which claims priority to U.S. Provisional Patent Application No. 62/291,238 filed on Feb. 4, 2016, both incorporated herein by reference.

TECHNICAL FIELD

The following relates to systems and methods for sensing an environment with wireless communication signals, and more particularly, for assessing the state of a plurality of areas experiencing sensing, detecting, extracting and/or compressing using static profiles as a baseline for activity recognition via such wireless signals.

DESCRIPTION OF THE RELATED ART

Many of the currently used wireless communication systems such as LTE, LTE-Advance, IEEE 802.11n and IEEE 802.11ac are continuously sensing the state of the wireless channel via well-known signals or pilot signals, in order to understand the environment and be able to, for example, dynamically optimize the throughput rate, or improve the robustness of the system. Those sensing mechanisms are found to be continuously improving and they enable self-driven calibration systems and wireless signal pre-compensation and post-compensation techniques, minimizing differences between the transmitted and received signals.

Measurable variables of wireless signals have been also used for location purposes. One of the most commonly used types of information for this purpose, is the wireless signal strength. For example, a positioning method for mobile devices has been developed and described in U.S. Pat. No. 7,042,391; where the received signal strength (RSS) data from multiple reference devices are collected. Based on a path loss function, the RSS data are then used to estimate the distances between the target and the reference devices. Another positioning method for mobile devices has been proposed in U.S. Pat. No. 7,042,391; which builds a mapping between the RSS data and the device location, and stores this mapping as the calibration data. The method then compares the new RSS data with the calibration data to estimate the location of the target device. A field testing tool referred to as "OmniTester" has been developed and is described in U.S. Pat. No. 7,577,238; which integrates signal-strength and error-rate testing for wireless networks.

More fine-grained information is available in modern communication systems and several approaches have been proposed in order to improve those systems. For example, a method that provides periodic channel state information (CSI) data has been developed and is described in U.S. Patent Application Publication No. 2011/0242982. A plurality of reports in an aggregated form is provided, which includes CSI on a plurality of component carriers. A method for detection of failure and recovery in a radio link has been proposed and is described in U.S. Patent Application Publication No. 2010/0034092, where CSI data is used to estimate the transmission block error rate. A method for transmitting data in a multiple-input multiple-output (MIMO) communication system has been designed and is described in U.S. Pat. No. 7,729,442, where channel quality information (CQI) is fed back from the receivers to the transmitters. This CSI is then adopted to determine all data transmission rates of the sub-streams. However, these fine-grained measurement can be valuable, not only for communication purposes, but for other purposes.

SUMMARY

It has been found that the above-described approaches could be adapted to use the fine-grained information already available in the current communication systems to understand certain states of the environment, what is referred to herein as "static profiles", for example to reveal the presence of moving objects or the activities performed in an environment by humans and/or animals, etc.

In one aspect, there is provided a method for sensing an environment, the method comprising analyzing at least one wireless signal in the environment to determine effects on the wireless signal by the environment during propagation thereof, the effects being indicative of either or both: at least one characteristic of the environment, and a way the environment is configured In other aspects there are provided a system and computer readable media configured for performing the method.

BRIEF DESCRIPTION OF THE DRAWINGS

Embodiments will now be described by way of example only with reference to the appended drawings wherein.

DETAILED DESCRIPTION

It has been recognized that wireless signals in an environment can be analyzed to determine effects on the signals as they propagate through the environment. In this way, characteristics of the environment can be determined. The characteristics can be determined using static profiles.

A static profile is defined herein as a stable behavior observed in measurements obtained from the sensing of a particular area; while employing wireless signals reflecting no variation or negligible variations from measurement to measurement of wireless signal intensity, channel frequency response, impulse response, or any other measurable variables of the wireless signals that are sensitive to changes in an environment. The static profile can be summarized with at least a two-dimensional figure capturing the behavior of the variable or parameter that has been measured.

These measurements can be taken from the sensing mechanisms implemented in current wireless communication systems, for example, when using sounding signals, which are known by both the transmitter and receiver. These sounding signals can provide valuable information to the system regarding the current state of the wireless channel, since the receiver knows the signal that the transmitter is sending and it can compute, for example, the frequency response of the channel, and can provide this feedback to the transmitter or any devices in the system.

For example, the static profile of an empty house could be detected and extracted to be used as a baseline for activity recognition. Static profiles could also be detected and extracted even if subjects (e.g., humans or pets) are within the sensing area. However, these profiles would still exist due to either the absence of movement or due to minor activities of the subjects that are considered as static profiles as well as according to the system specifications. As another example, a static profile could be identified and extracted within a short period of time (e.g., a few milliseconds) while an activity is being performed, if the sampling rate is high enough, e.g. while walking in one direction, stopping for turning around and start walking back. Examples of such static profiles and the use thereof are described below.

Figure 1A:
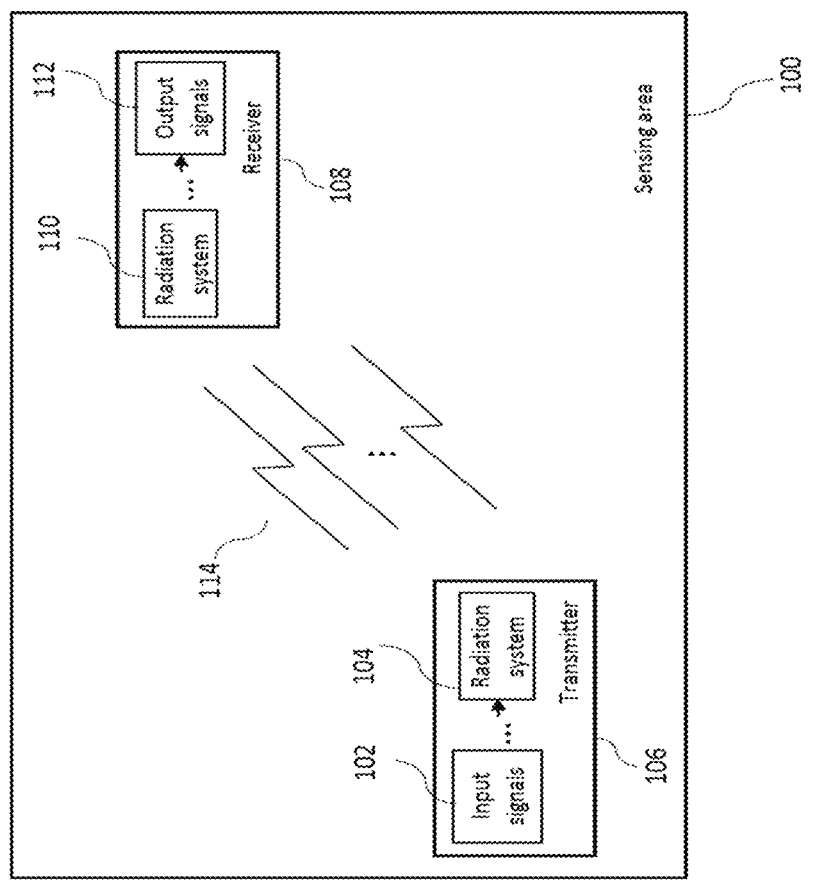
FIG. 1(a) illustrates a configuration for a system capable of sensing a particular sensing area by analyzing system output signals.

As illustrated in FIG. 1(a), a sensing area 100 is generated through at least two devices, a transmitter 106 and a receiver 108. The transmitter 106 should create the baseband input signals 102 that will modulate a carrier signal and an antenna or an array of antennas, represented by "radiation system" 104, radiates a bandpass signal with a defined bandwidth that satisfies the sensing requirements. The radiated waves 114 travel through the sensing area while typically suffering multiple propagation effects, and interacting with the multiple objects in the environment that are disposed in a particular way. A receiver apparatus 108 is configured to transform non-guided radio waves into guided radio waves through a receiver antenna or an array of receiver antennas, herein the "radiation system" 110. Since the received signal is the superposition of the received signals that traveled through the direct path, and the signals typically travel through many other different paths (multipath effect), the received signal should contain valuable information that characterizes the environment. This valuable information can be captured by the output signals 112. In an indoor area, the multipath propagation mechanisms are normally reinforced, generating what is referred to herein as the sensing area 100.

Multiple streams of the radiate waves 114 can be used to generate the sensing area 100 if at least more than one antenna is used, either in the receiver 108 or in the transmitter 106. A single stream is formed between each pair of transmitter and receiver antennas. All possible streams are represented by reference numeral 114 in FIG. 1(a), and individually referred to as stream 1, stream 2, and up to stream N in the subsequent description.

The boundaries of the sensing area 100 could be well defined, but may not necessarily be. In most cases, the specific shape of the sensing area 100 is unknown since it will depend on the environment, the specific communication system generating the sensing area 100, the power levels employed by the transmitter 106, carrier frequency, and signal bandwidth, among other things.

Figure 1B:
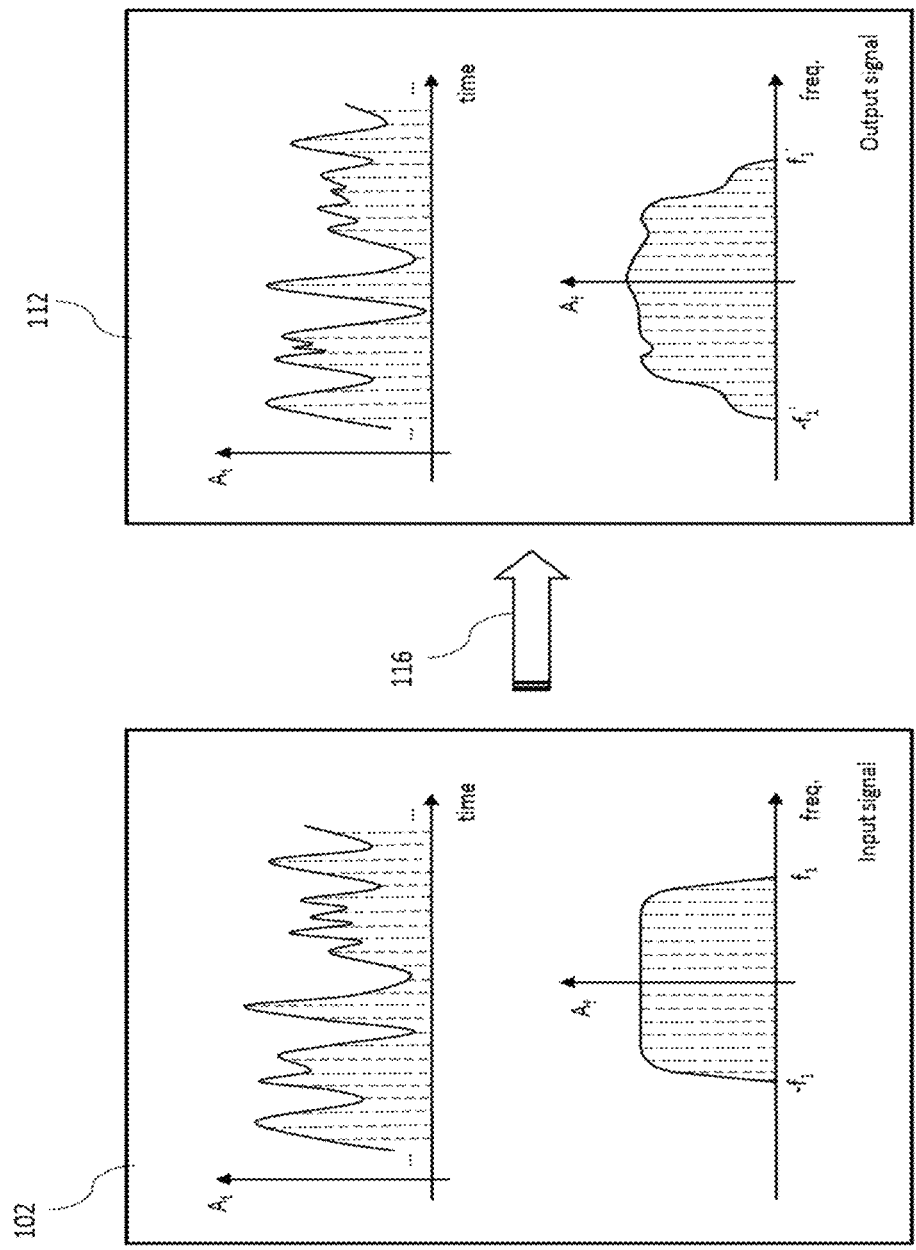
FIG. 1(b) shows a transformation of an input signal into an output signal characterizing a sensing area.

Example input signals 102 are illustrated in FIG. 1(b). Without loss of generality, wireless signals are represented herein by their equivalent baseband complex signals. The input signal is represented in time and frequency domains and the magnitude of the original baseband complex representation is used. For the sake of comparison, the same considerations are applied to the output signal 112 used as an example in FIG. 1(b). The input signal 102 includes periodic or non-periodic signals with a corresponding bandwidth depending on the nature of the signals employed for the sensing. The output signal 112 is a distorted version of the input signal 102 as shown in FIG. 1(b) wherein the bandwidth of the signal is different from the one used in the transmitter 106. A central frequency offset may also exist, and both in-band and out-of-band distortion is also represented. The transformation 116 describes the transformation of the input signal 102 into the output signal 112 and herein it is used as a descriptor agent of the environment within the sensing area 100. The transformation 116 affects both the amplitude and phase of the input signals 102 resulting in the output signals 112. It can be appreciated that the transformation 116 is caused by natural effects, since the transmitted signal 102 interacts with the environment and the received signal would be a modified version (in both amplitude and phase) of what was transmitted. The specific way in which the input signal 102 is modified by the environment provides information about the environment. The converse would be that, if the input signal is not modified, the transformation=1, where the input signal=the output signal, there would be no information provided about the environment.

All of the signals herein, e.g. 102 and 112, are generated either in the digital or analog domain and are acquired in the receiver side and analyzed in either digital or analog domain as well.

In one implementation, a narrowband and flat-fading channel is assumed, the relationship $$H_k^{(l)}[n] = \frac{Y_k^{(l)}[n]}{X_k^{(l)}[n]},$$

k=1, 2, . . . , K, and l=1, 2, . . . , L, is adopted to describe the channel response in the frequency domain for each of the streams 114 used to generate the sensing area 100.

$H_k^{(l)}[n]$ denotes the channel response and/or the transformation of subcarrier k in stream l at time n.

$X_k^{(l)}[n]$ is the pilot signal transmitted on subcarrier k in the frequency domain in stream l at time n, and $Y_k^{(l)}[n]$ is the received signal on subcarrier k in the frequency domain and in stream l at time n.

The total number of subcarriers available in each stream is represented by K and, and L is the total number of streams.

In FIG. 1(a), the receiver 108 may or may not have knowledge of the specific input signal 102 used by the transmitter 106. In either case, the receiver 108 is the apparatus able to generate a sensing result based on the analysis and processing of the output signal 112. On the other hand, the system illustrated in FIG. 1(*c*) provides sensing functionalities in both directions by using transceivers instead of a single transmitter and a single receiver when compared to the system presented in FIG. 1(*a*).

Figure 1C:
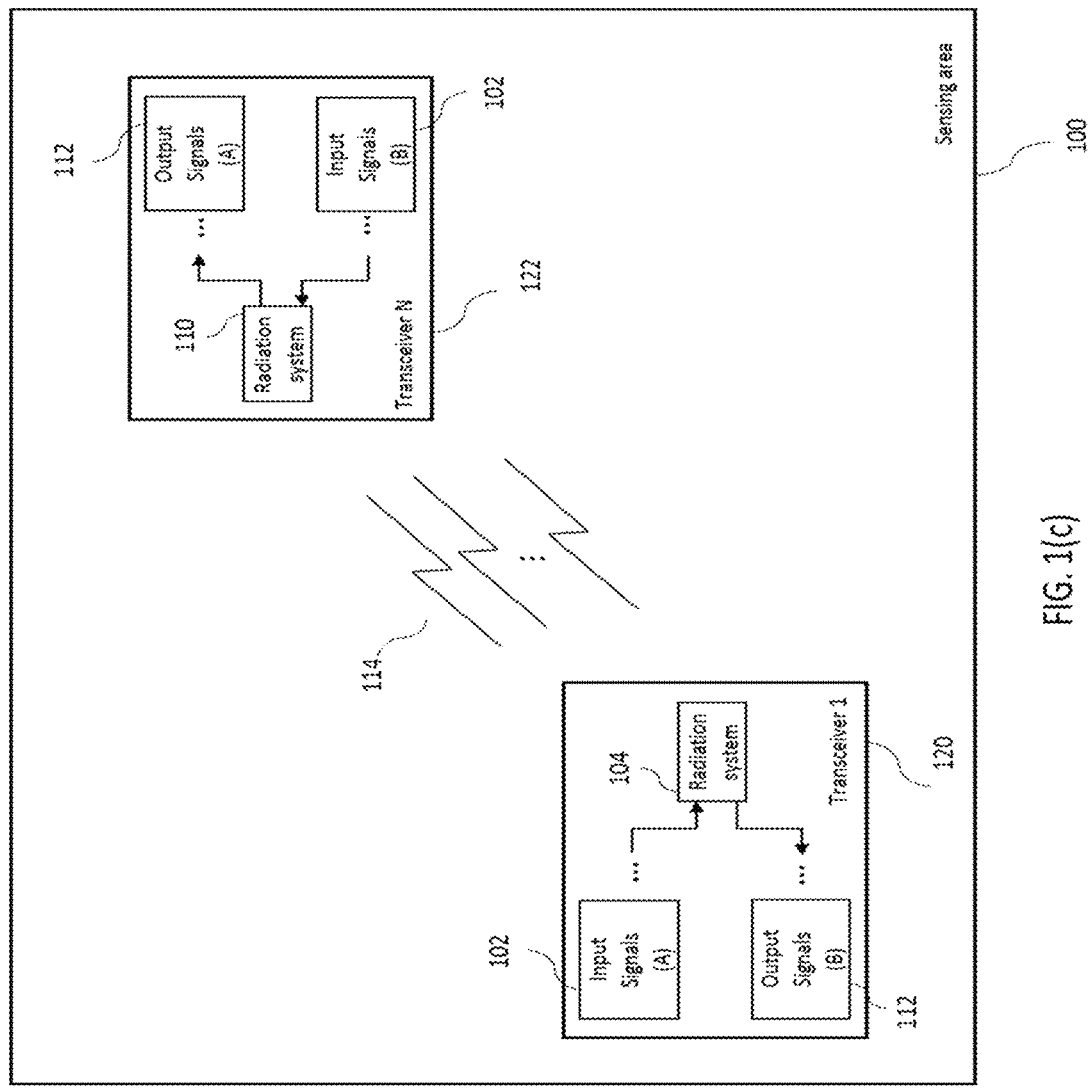
FIG. 1(c) illustrates a configuration for a system capable of sensing a particular sensing area by employing transceivers that simultaneously, if desired, provide sensing results on both devices.

In FIG. 1 (*c*), the transceiver 120 is capable of transmitting and receiving wireless signals by using the radiation system 104. The same applies to the transceiver 122 by using the radiation system 110. Whether there is a multiplexing system in time for sharing the same frequency spectrum segment, or different frequency bands are employed, a full duplex communication link is established between the two transceivers. When the input signals 102 are generated from the transceiver 120, and the output signals 112 are analyzed in transceiver 122, a communication link (A) is established, meaning that transceiver 120 is acting as a transmitter and transceiver 122 is acting as a receiver in the communication link (A). The same applies when transceiver 122 generates the input signals 102, and the output signal 112 corresponding to the communication link B is now available in transceiver 120, providing the system in FIG. 1(*c*) with sensing capabilities in both apparatus 120 and 122. FIG. 1(*c*) is not designed to provide a specific network topology for the system proposed herein although it describes the interaction between the minimum number of units required for generating a sensing area 100 and provide sensing capabilities in both transceivers.

Figure 2:
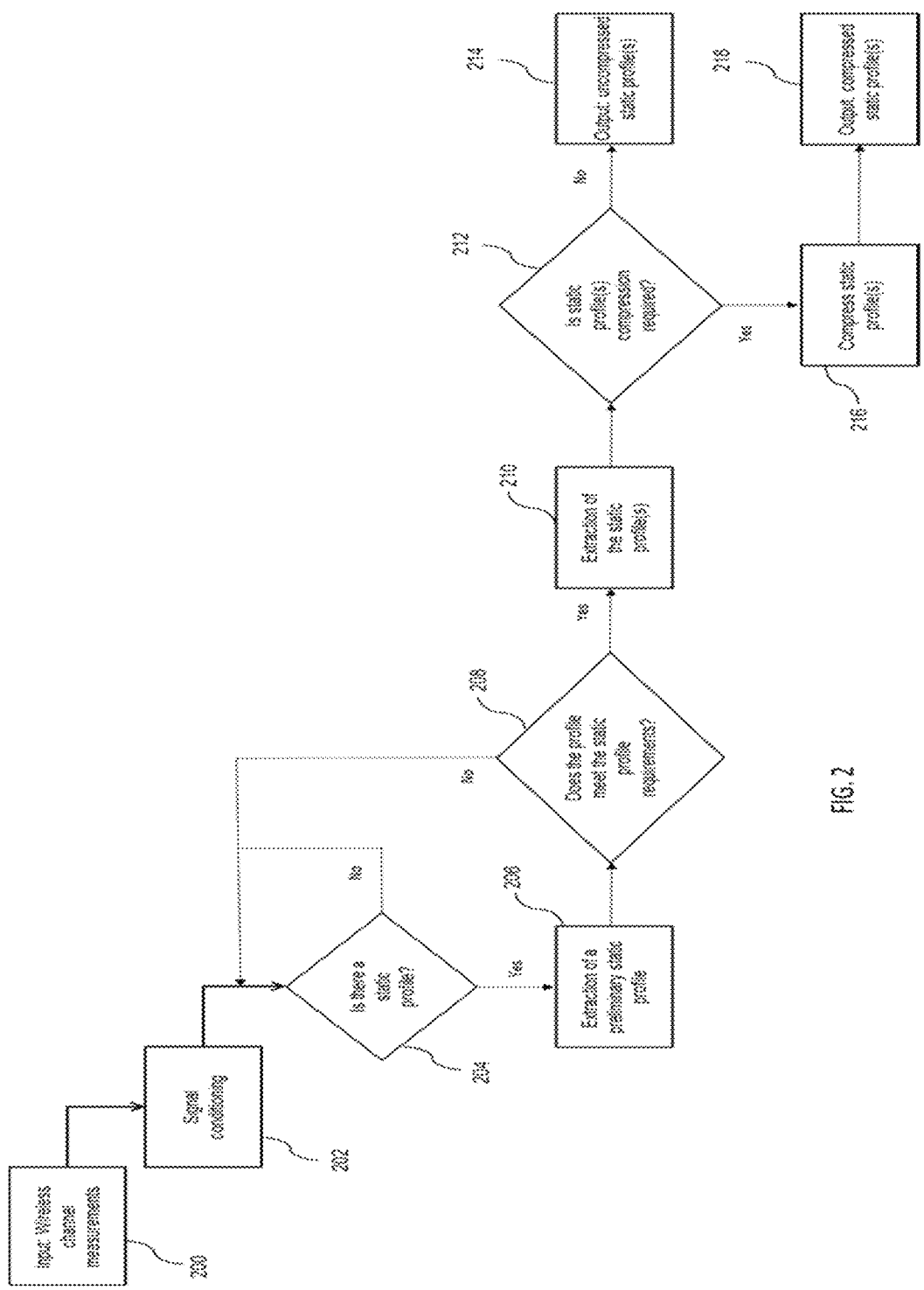
FIG. 2 is a flow chart illustrating computer executable instructions showing global functionalities for extracting static profile(s)

FIG. 2 is a high-level flow chart of a process for detecting, extracting, and/or compressing static profiles to be employed as a baseline for activity recognition through wireless signals. Firstly, the wireless channel measurements that characterize the sensing area 100 are provided at 200, to an analytics application that runs either locally in an embedded solution or in a remote application, for processing the measurements extracted from the device(s) in the communication system. Signal processing techniques are applied at 202 in order to filter the received signal, and/or normalize the available measurements, and/or apply any other signal conditioning technique, and/or parse the data to be transferred to the subsequent operations. A process is applied at 204 for continuously evaluating the state of the active sensing area 100, and if a static profile is detected, the process at 206 is activated for extracting a preliminary version of the static profile for each of the available streams depending on the system. The static profile(s) is/are then evaluated at 208 in order to meet the static profile requirements defined for the application. The extraction of the static profile(s) is performed at 210 according to the specifications provided, and if a compressed version of the static profile(s) is required, a compression method is applied at 216 in order to represent the static profile(s) with as few number of coefficients as possible in the output at 218. In scenarios where a compression method is not needed, the system can provide the output at 214 as an uncompressed static profile(s). A more detailed description of the identification and extraction of static profile(s) is provided below, making reference to FIGS. 3-8.

Figure 3:
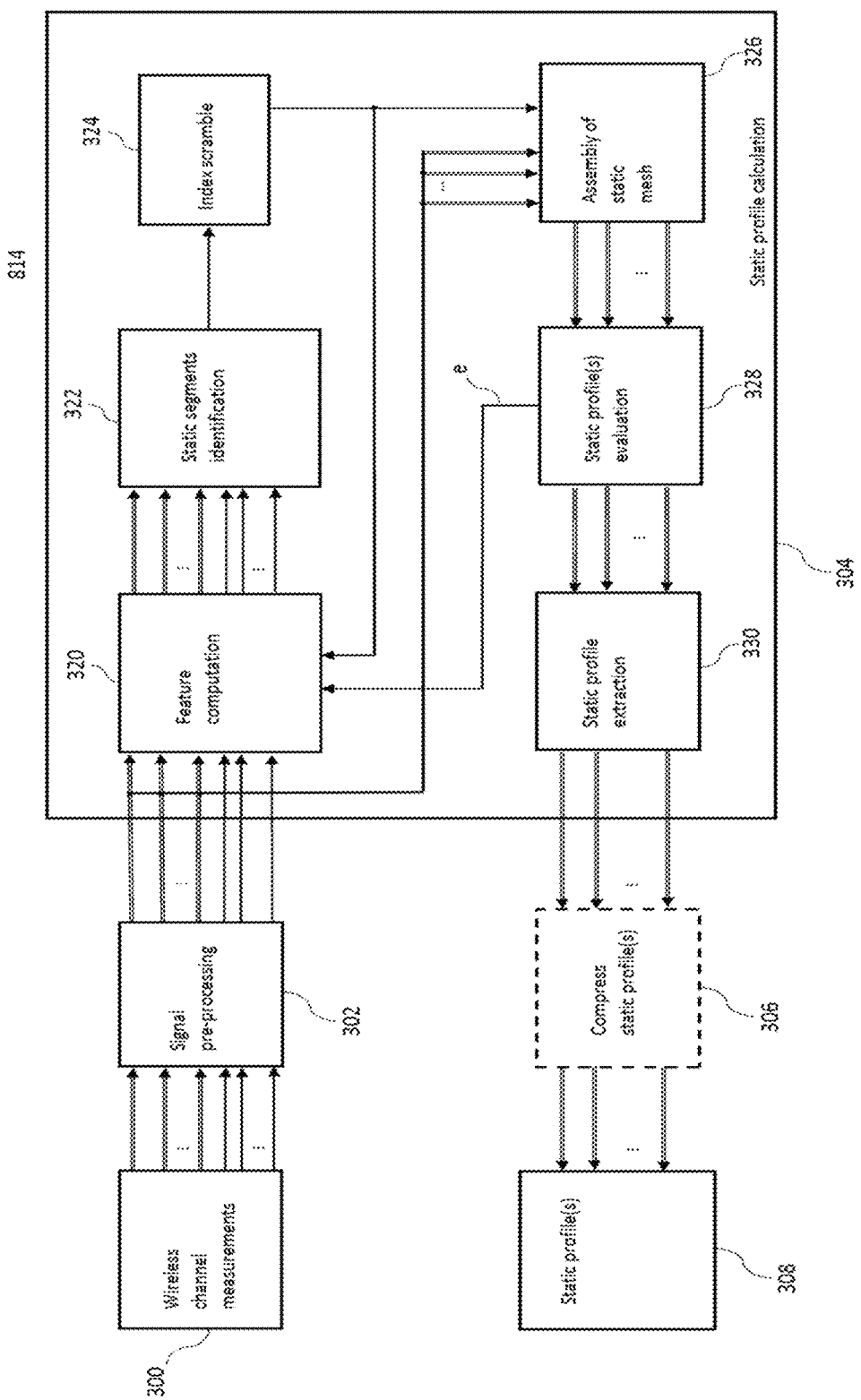
FIG. 3 is a block diagram illustrating a process for identifying, extracting, and/or compressing static profile(s)

FIG. 3 illustrates schematically, a process for extracting one or more static profiles. The process begins by receiving measurements that characterize the sensing area 100 for all of the streams that are available, according to the wireless system that is employed for generating the sensing area 100. Different streams are formed due to the established link between each transmitter antenna and each receiver antenna. The measurements 300 include channel frequency response or channel impulse response per each stream, received wireless signal intensity per received antenna and any other measurable variables on the wireless signals sensitive to changes in the environment.

The process flow shown in FIG. 3 requires the channel measurements 300 for at least one stream corresponding to one transmitter antenna in the radiation system 104, and one receiver antenna in the radiation system 110. A signal pre-processing block is operated in 302 in order to filter the measurements available through the measurements 300. The signal pre-processing block 302 provides clean time series of the channel measurements to the feature computation block 304. It can be appreciated that optional functionality could be added to the signal pre-processing block 302 for normalizing the samples obtained in the measurements. The static profile calculation at 304 is accomplished by the combination of a feature computation 320, a static segments identification 322, an index scramble process 324, an assembly of static mesh stage 326, corresponding to the static profile, an evaluation of the current static profile mesh at 328, and a final extraction of the static profile 330.

Optionally, as shown using dashed lines in FIG. 3, a compression operation can be applied to the static profiles at 306. As a result or output, the static profile at 308 includes at least one static profile extracted from the measurements obtained from a receiver antenna while a transmitter antenna is employed in, for example, one of the transmitter or transceiver devices of FIG. 1 or FIG. 3. If multiple streams are available in the system, the grouping of all the static profiles compose the final static profile that characterize the sensing area 100.

Figure 4:
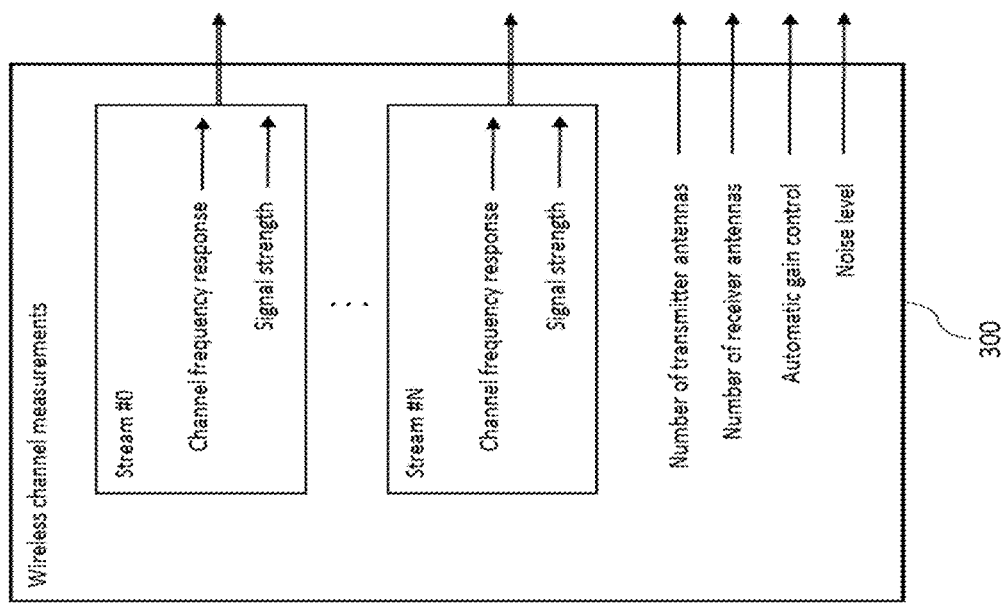
FIG. 4 illustrates various examples of variables that can be measured per stream while using wireless signals as well as parameters related to a wireless interface.

FIG. 4 provides examples regarding measurements that can be gathered in any of the transmitter, receivers, and/or transceivers illustrated herein. The wireless channel measurements block 300 can continually monitor the communications between the transmitter and the receiver, so as to gather timely information that infers human activities inside the sensing area 100. The information metrics include, for example, measurements of channel frequency responses of all streams (e.g., channel state information in IEEE 802.11n, IEE 802.11ac) and their time domain transforms, received signal strengths of all streams, the number of transmitter antennas, the number of receiver antennas, the value of automatic gain control (AGC), and/or the noise level. For either particular ones of packages, or for each package that is received in the devices, the above mentioned parameters can be measured and recorded. The combination of these metrics from a wireless packet is referred to herein as one "measurement sample". The real-time channel measurement module indexes all samples consecutively according to their measurement time stamps. The samples, as well as their indices, are then fed to the next module, i.e. the signal pre-processing module.

Figure 5:
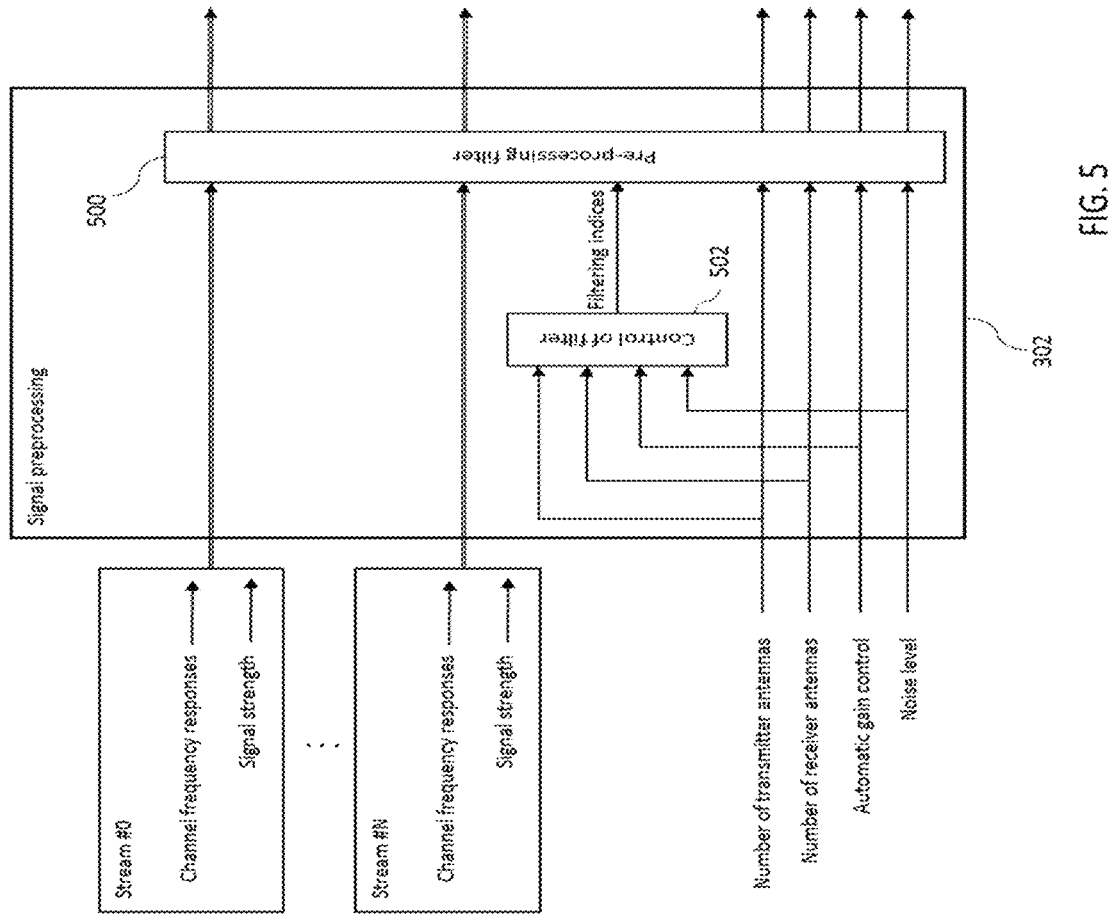
FIG. 5 is a block diagram illustrating a pre-processing of obtained measurements.

In FIG. 5, additional details are provided regarding the preprocessing of signals. The signal preprocessing block 302 is responsible for filtering out corrupted measurement samples, so as to guarantee, or at least strive to ensure that information used to generate the profile is consistent. The signal preprocessing block 302 contains a preprocessing filter 500 and a filter controller 502. The controller 502 takes the numbers of transmitter and receiver antennas, the value of AGC, and the noise level as inputs, determines the indices of samples that should be filtered, and feeds these indices to the preprocessing filter 500. The measurement samples that meet one of the following criteria are considered as corrupted, and are discarded:

A) The numbers of transmitter and receiver antennas do not comply with predefined value(s), which is determined by application requirements;

B) The value of AGC is out of a predefined AGC range, which is determined by application requirements; and C) The noise level is out of a predefined noise range, which is determined by application requirements.

After receiving the filtering indices, the preprocessing filter 500 discards the corrupted measurement samples. The remaining samples may be referred to as preprocessed samples, and will be fed to the next block 304.

Figure 6:
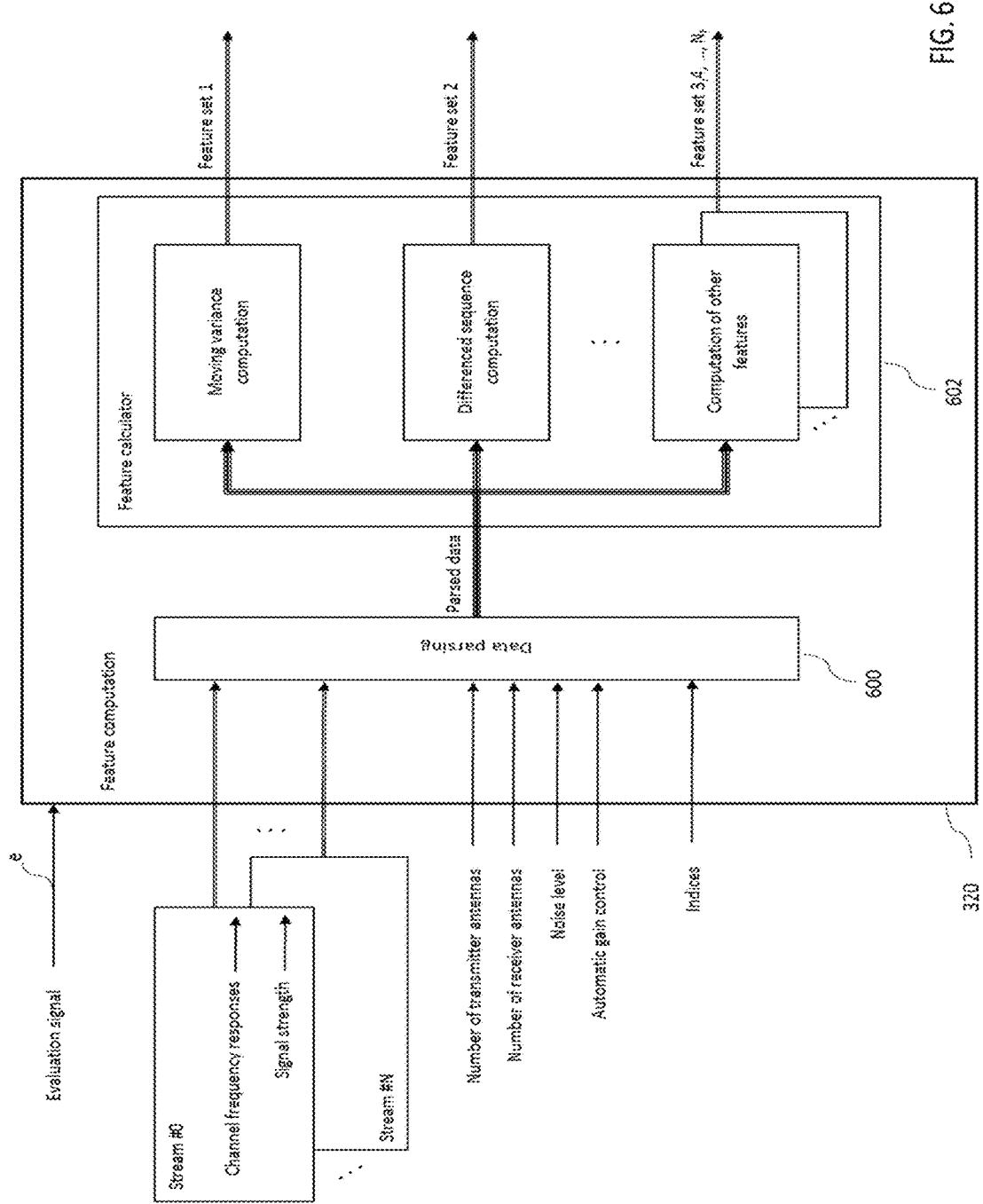
FIG. 6 is a block diagram illustrating a machine learning computation module that provides different sets of features for at least one stream.

FIG. 6 illustrates further detail regarding the computation of useful features. The feature computation block 320 extracts useful features from the preprocessed samples. The ON/OFF of 320 is controlled by the evaluation signal e, of which the default value is "False". If the evaluation signal e is "False", then block 320 is turned ON. Otherwise, block 320 is turned OFF. A set of indices is fed to block 320 for identifying the samples to be used. Only samples whose indices are in the set are used in the data parsing, and later, the feature computation. Upon execution, block 320 parses the sample data into a computational-friendly format with the data parsing block 600. Based on the parsed data, the feature calculator 602 computes different features. Useful features may include, for example, the moving variance of CSI magnitude and the moving variance of the differenced sequence of CSI magnitude. The output of feature calculator 602 is $N_f$ sets of features. Each of these sets contains one type of feature for all subcarriers.

Figure 7:
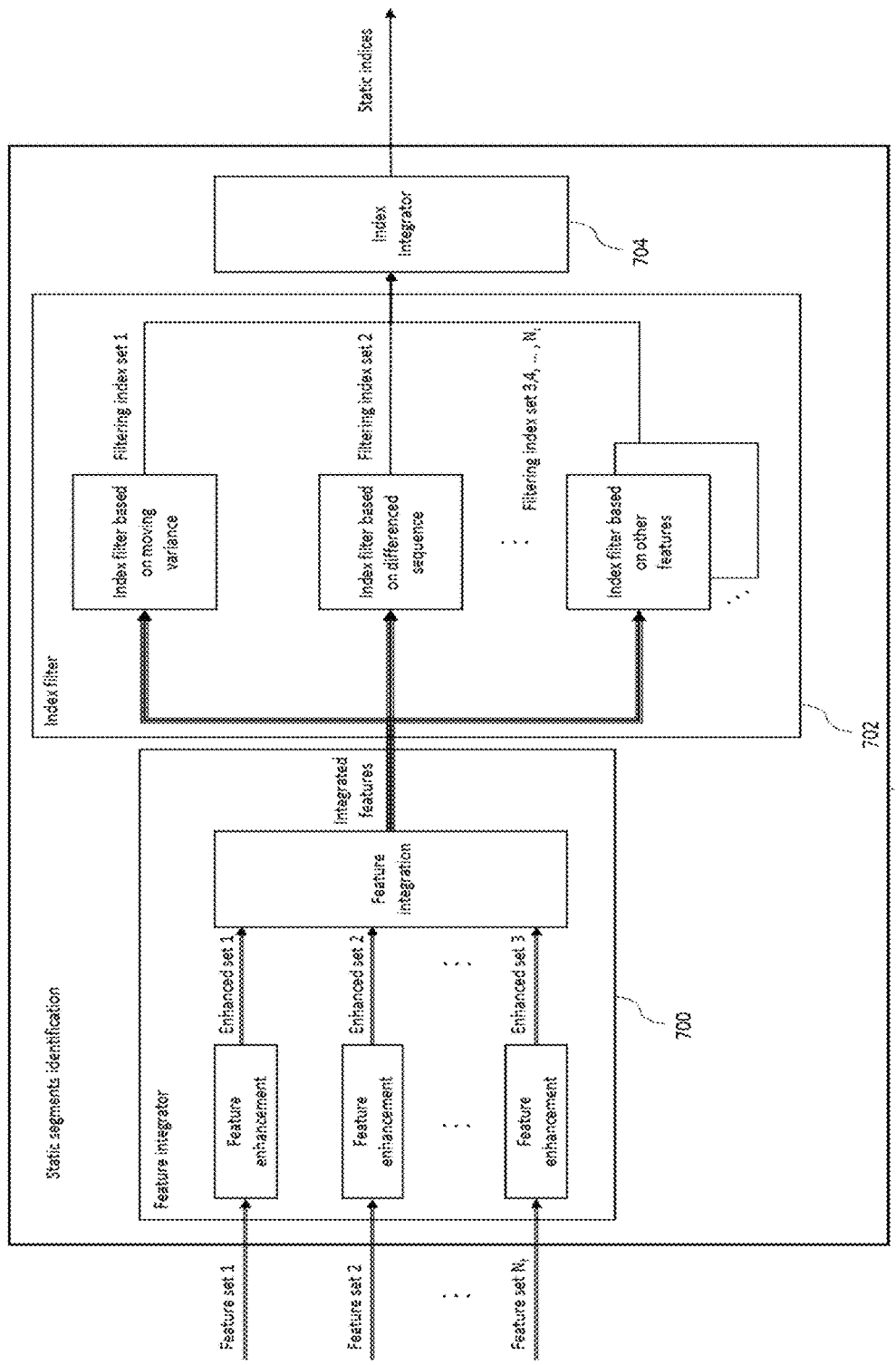
FIG. 7 is a block diagram illustrating a process for identifying measurement segments from where a static profile could potentially be extracted.

FIG. 7 demonstrates how to identify the static segments. The static segments identification block 322 takes the feature sets from the feature computation block 320 as inputs, identifies the static segments in the measurement results, and outputs the corresponding indices. The inputs, i.e., the feature sets, are first enhanced by the feature integrator 700. Each enhanced feature set is the original feature set being mapped to either a higher-dimension space, a same-dimension space, or a lower-dimension space. Examples of enhancements include, for example, calculating the mean and variance values of a feature set, finding the minimum and maximum of a feature set, and calculating the histograms of a feature set.

The enhanced sets are then integrated into one set of integrated features. Examples of integrations include, for example, analyzing the principle components, conducting singular value decomposition, and computing correlations between two feature sets. These integrated features are used as inputs to the index filter 702, which distinguishes static segments from non-static ones in the measurement results and output the indices of results inside the static segments. The index filter 702 includes multiple filters, each of which outputs one set of candidate indices based on its unique criterion. Examples of filtering criteria include, for example, thresholding with the moving variance of CSI magnitude and/or the moving variance of the differenced sequence of CSI magnitude. In this way, multiple sets of candidate indices are computed and output by 702. The index integrator 704 collects these candidate index sets, and computes one integrated set of indices as the static indices. Examples of index integration methods include, for example, the union of all candidate sets, the intersection of all candidate sets and a voting approach.

Figure 8:
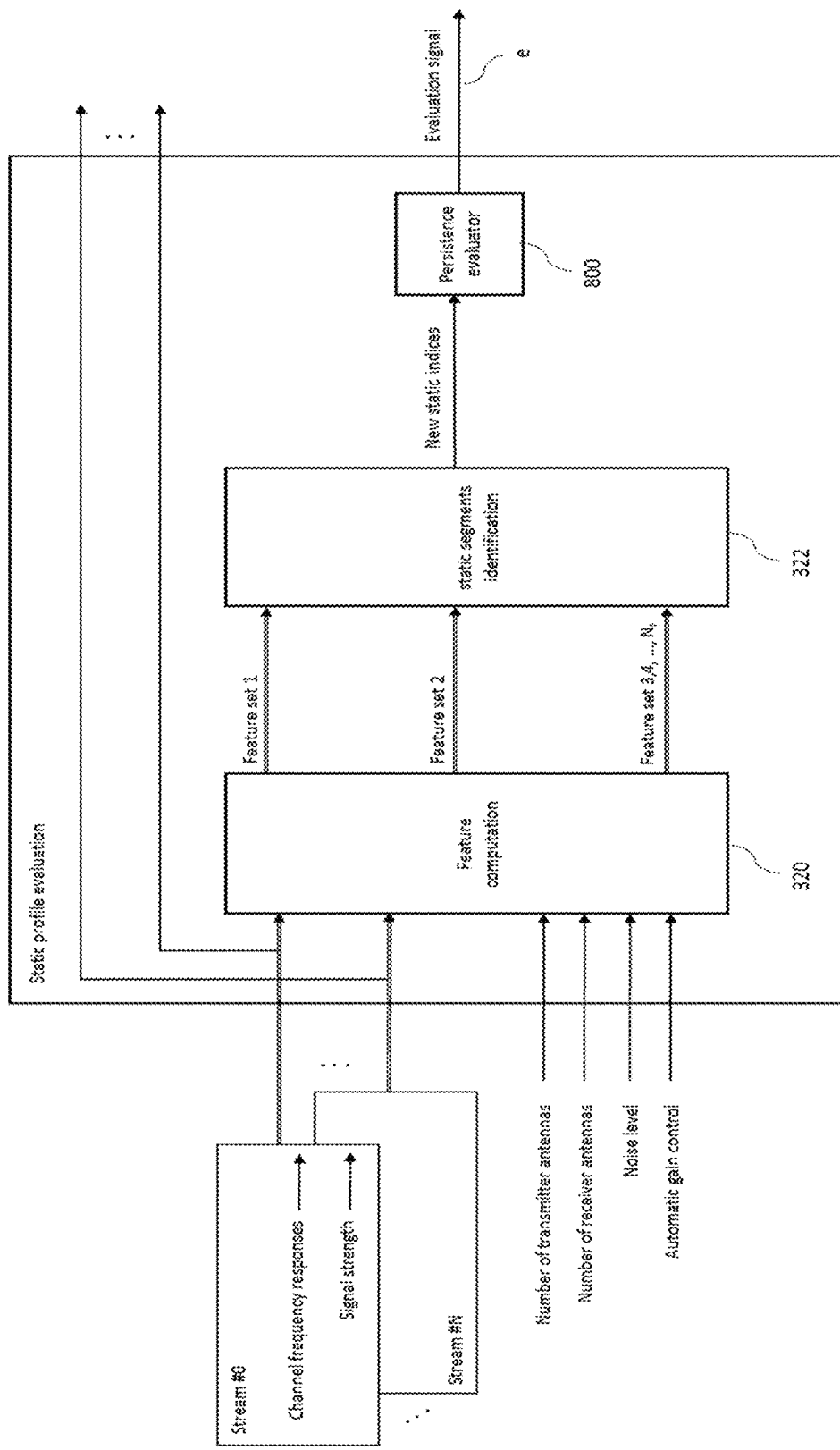
FIG. 8 is a block diagram illustrating a process for evaluating whether or not an extracted profile meets system requirements.

FIG. 8 provides further detail regarding the static profile evaluation block 328, which takes the assembled measurement samples, as well as the assembled indices, as inputs. The static profile evaluation 328 evaluates whether the assembled samples are valid to build a static profile, and outputs the evaluation result as the evaluation signal e. The assembled samples go through feature computation 320 and static segments identification 322 again. In this way, a new set of static indices is computed based on the assembled measurement results. These new static indices are evaluated by the persistence evaluator 800 to check whether the assembled samples are persistent enough to build a static profile. Examples of metrics used for persistence evaluator 800 include the size difference between the sets of old and new static indices and the earth mover distance between these two sets. If the samples pass the evaluation, the evaluation signal e is set as "True". Otherwise, the evaluation signal e is set as "False".

Figure 9:
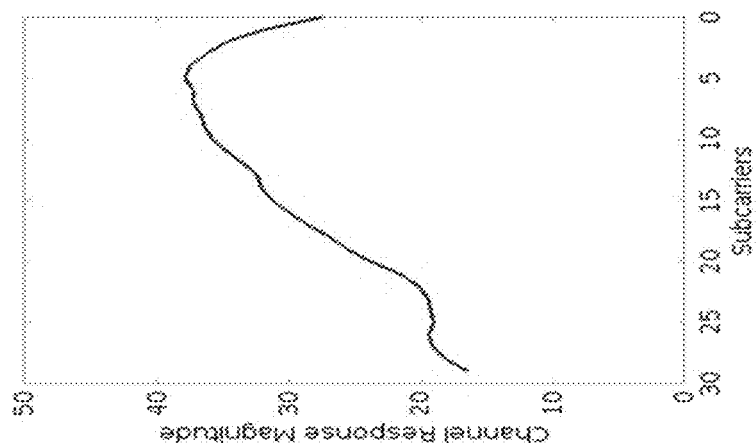
FIGS. 9(a) to 9(c) illustrate an extraction of a static profile for one stream and the channel state information measurements from where this static profile was identified and extracted.
Figure 9:
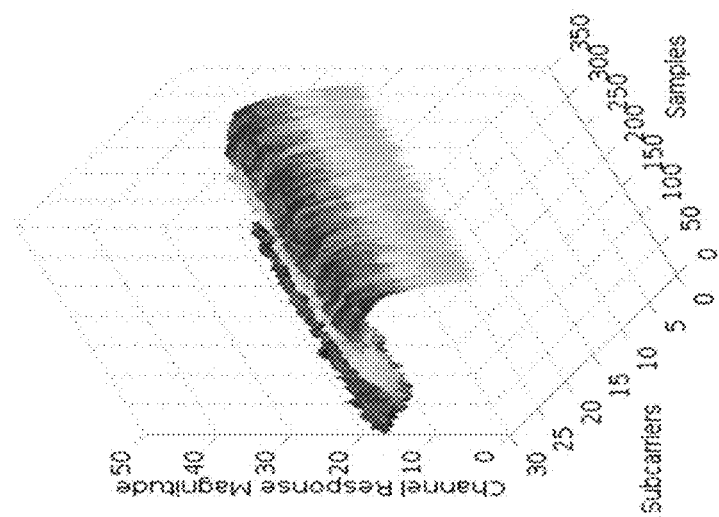
Figure 9:
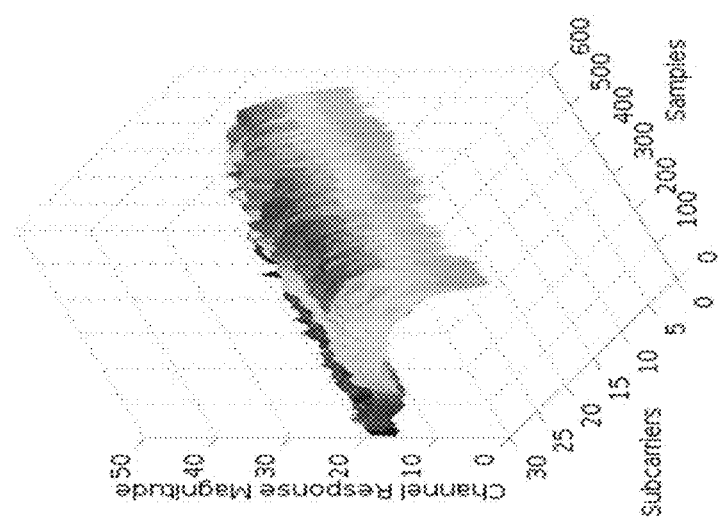

FIGS. 9(a) to 9(c) illustrate an example of extracting a static profile from wireless signals. FIG. 9(a) provides an example of the measurement samples of channel response magnitude, which are measured and recorded by block 300. It can be seen in FIG. 9(a) that the measurement samples contain instances that are inconsistent with the overall behavior and/or contain large noise. These samples should be discarded before building a static profile. To this end, the measurement samples are fed to block 302 for preprocessing and then to block 304 for static profile calculation. FIG. 9(b) illustrates an example of the static samples that have passed the static profile evaluation. These static samples contain only measurement samples that align with the overall behavior and are stable enough to build a profile. It can be appreciated from FIG. 9(b) that the inconsistent and noisy samples have been filtered out, and the remaining ones are consistent with each other. Such samples are ready to build a static profile. FIG. 9(c) plots an example of the static profile built from the static samples shown in FIG. 9(b). In this example, the profile is built or summarized by using the time-average values for all the subcarriers. The curve shown in FIG. 9(c), i.e., the static profile, defines how the measurements should be in average.

Figure 10C:
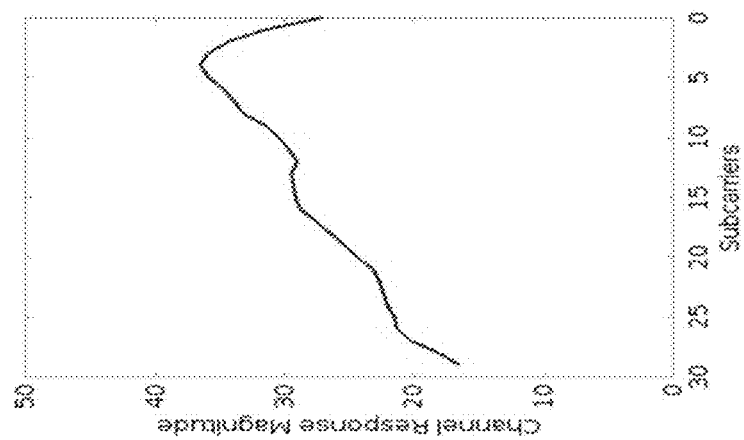
FIGS. 10(a) to 10(c) illustrate an extraction of a static profile for one stream and the channel state information measurements from where this static profile was identified and extracted.
Figure 10B:
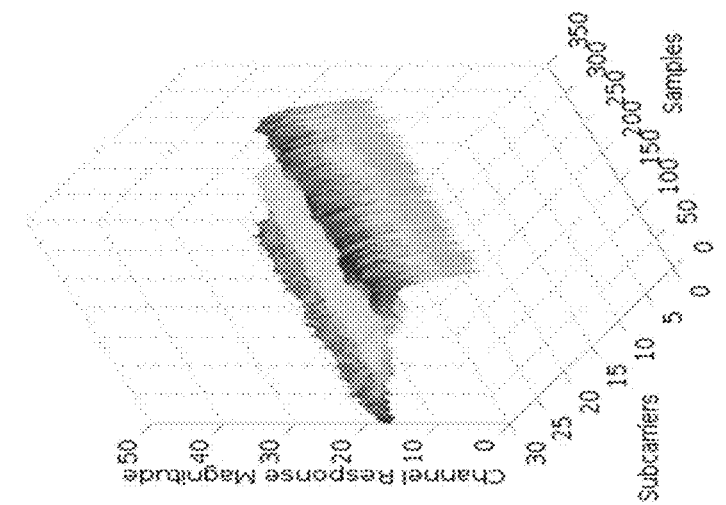
Figure 10A:
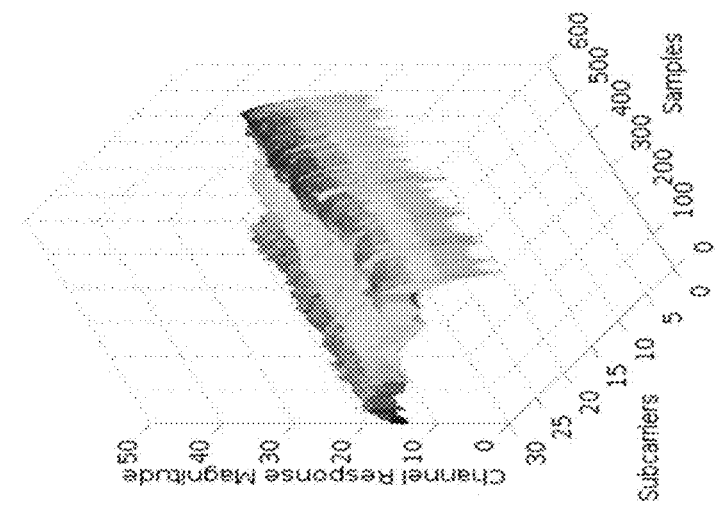

FIGS. 10(a) to 10(c) provide another example of extracting a static profile. Different from the example shown in FIGS. 9(a) to 9(c), measurement samples shown in FIG. 10(a) contain few noisy or inconsistent instances. However, there is a slowly increasing tendency, which may introduce undesired noise to the static profile. To eliminate the impact of such tendencies, block 324 conducts a scrambling on the samples before feeding them into the static profile evaluation block 328. In this way, the scrambled samples do not experience the slowly changing tendency, as shown in FIG. 10(b). Based on these scrambled samples, a static profile can be extracted with high confidence, as shown in FIG. 10(c).

Referring again to FIG. 3, the compression of the static profile(s) in 306 allows the representation of these profiles independently from the number of frequency components, or any other sequence of samples, or time series composing the static profile(s). A compression method could include a behavioral model that fits the input signal 102 to the output signals 112 and instead of using the uncompressed static profile, a compressed static profile consisting in the coefficients of such behavioral model is shared as the static profile(s). This model could be a polynomial based model that guarantees a good signal fitting or any other model that accurately represents the output signal 112 when the input signal 102 is known. If the input signal 102 is unknown, the output signal 112 can be used directly as a descriptor of the environment, and then a reference signal is used to extract the behavioral model's coefficients. In such a scenario, the reference signal should be known by the application that decodes the compressed static profiles(s).

The static profile(s) is/are the result of specific propagation paths, following different delays, different attenuation, reflections and scattering effects characterizing the environment or the sensing area in which the wireless signals are travelling from transmitter to receiver stations. The static profile(s) is/are therefore characterizing the way the space is configured.

An illustrative example of a static profile is when the sensing area 100 is within a space where there no objects are moving within the sensing area 100. A house, an apartment, and/or a business facility, among others, can possess clear static profiles when no subjects are moving within the sensing area 100. In another scenario, when people are watching a television (or other screen), a variety of static profiles could be detected depending on the number of people remaining static or semi-static in front of the television, and the position that each of them holds in the scenario. For instance, the current static profile(s) of a sensing area 100 can be compared to a previous record of the static profile(s) of the same sensing area 100 and the comparison being indicative, for example, of the need for run calibration or self-calibration mechanisms while performing activity recognition via wireless signals.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the components in the sensing area 100, any component of or related to the sensing area 100, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for sensing an environment, the method comprising analyzing at least one wireless signal in the environment to determine effects on the wireless signal by the environment during propagation thereof, the effects being indicative of either or both: at least one characteristic of the environment, and a way in which the environment is configured; wherein the effects on the wireless signal are determined using static profiles that model stable behavior in the environment, by:
obtaining one or more wireless channel measurements;
pre-processing the one or more wireless channel measurements and performing a feature computation operation to identify one or more static segments;
performing a static profile evaluation using the one or more static segments;
performing a static profile extraction based on the evaluation; and
outputting one or more static profiles.

2. The method of claim 1, wherein the analyzing comprises determining a transformation of an input signal to an output signal, the output signal being a received wireless signal.

3. The method of claim 1, further comprising applying an index scramble to the static segments and preparing an assembly of a static mesh prior to performing the static profile evaluation.

4. The method of claim 1, further comprising compressing the one or more static profiles.

5. The method of claim 1, further comprising using static profiles for at least one of:
a baseline for activity recognition; and
a comparison of static profiles at different points of time.

6. The method of claim 5, wherein the static profiles are used to determine if a calibration is required.

7. The method of claim 1, wherein the at least one wireless signal is a pilot signal.

8. The method of claim 1, wherein channel state information measurements from a standardized wireless protocol are used in the analyzing.

9. The method of claim 1, further comprising generating at least one wireless signal.

10. The method of claim 1, further comprising reusing at least one wireless signal.

11. The method of claim 1, further comprising analyzing the static profiles.

12. The method of claim 11, wherein the analyzing comprising applying a movement assessment.

13. The method of claim 1, wherein a plurality of wireless signal streams are analyzed.

14. A non-transitory computer readable medium comprising computer executable instructions for sensing an environment, comprising instructions for analyzing at least one wireless signal in the environment to determine effects on the wireless signal by the environment during propagation thereof, the effects being indicative of either or both: at least one characteristic of the environment, and a way in which the environment is configured; wherein the effects on the wireless signal are determined using static profiles that model stable behavior in the environment, by:
- obtaining one or more wireless channel measurements;
- pre-processing the one or more wireless channel measurements and performing a feature computation operation to identify one or more static segments;
- performing a static profile evaluation using the one or more static segments;
- performing a static profile extraction based on the evaluation; and
- outputting one or more static profiles.

15. A system comprising a processor and memory, the memory storing computer executable instructions for sensing an environment, comprising instructions for analyzing at least one wireless signal in the environment to determine effects on the wireless signal by the environment during propagation thereof, the effects being indicative of either or both: at least one characteristic of the environment, and a way in which the environment is configured; wherein the effects on the wireless signal are determined using static profiles that model stable behavior in the environment, by:
- obtaining one or more wireless channel measurements;
- pre-processing the one or more wireless channel measurements and performing a feature computation operation to identify one or more static segments;
- performing a static profile evaluation using the one or more static segments;
- performing a static profile extraction based on the evaluation; and
- outputting one or more static profiles.

16. The system of claim 15, wherein the analyzing comprises determining a transformation of an input signal to an output signal, the output signal being a received wireless signal.

17. The system of claim 15, further comprising instructions for applying an index scramble to the static segments and preparing an assembly of a static mesh prior to performing the static profile evaluation.

18. The system of claim 15, further comprising instructions for compressing the one or more static profiles.

19. The system of claim 15, further comprising instructions for using static profiles for at least one of:
- a baseline for activity recognition; and
- a comparison of static profiles at different points of time.

20. The system of claim 15, wherein channel state information measurements from a standardized wireless protocol are used in the analyzing.

* * * * *